Oct. 7, 1969     L. R. HANSEN     3,471,664

FLOAT-SWITCH MECHANISM TO MONITOR LIQUID LEVEL

Filed Feb. 23, 1967

INVENTOR.
LEE R. HANSEN

BY

ATTYS.

United States Patent Office 3,471,664
Patented Oct. 7, 1969

3,471,664
FLOAT-SWITCH MECHANISM TO MONITOR LIQUID LEVEL
Lee R. Hansen, Spokane, Wash., assignor to Lee's L.L.G., Inc., a corporation of Washington
Filed Feb. 23, 1967, Ser. No. 619,513
Int. Cl. H01h 35/18
U.S. Cl. 200—84                           2 Claims

ABSTRACT OF THE DISCLOSURE

The disclosure describes a liquid level monitor having a float assembly, two switch assemblies, and two sets of magnet activators. The float assembly has a housing with a cylindrical float freely positioned therein. The magnet activators are mounted on the ends of the float. Each switch assembly has a leaf spring with an electrical contact mounted thereon. The magnet activators are mounted to the leaf springs so that when they come into close proximity with the magnet activators the springs will deflect to either close or open the electrical contacts of the switch assemblies.

Background of the invention

My invention relates to liquid level monitors and more particularly to magnetic actuating electrical float switches for monitoring the liquid level in a remote reservoir.

One of the principal objects of my invention is to provide a liquid level monitor that is efficient and reliable in operation, simple in construction, and economical to manufacture.

An additional object of my invention is to provide a liquid level monitor that may be used for monitoring the level of nonconductive as well as conductive liquids.

A further object of my invention is to provide a liquid level monitor in which the actuation of the electrical switches is fast acting.

An additional object of my invention is to provide a liquid level monitor that is sealed so it may not be tampered with and to prevent moisture from adversely affecting electrical switches.

Summary of the invention

My invention concerns a liquid level monitor comprising a float assembly, one or more switch assemblies, and two or more magnetic elements for actuating the switch assemblies. The float assembly comprises a non-magnetic housing having a cavity formed therein for communicating with a liquid reservoir and a float positioned freely and unconnected within the cavity. Each of the switch assemblies are mounted in the ends of a cylindrical float housing and include a pair of electrical contacts in which one of the contacts is resiliently mounted for movement to and from the other contact. The magnetic elements comprise a first magnet mounted to the float and a second magnet operatively connected to the resiliently mounted contact.

Brief description of the drawings

A preferred embodiment of my invention is illustrated in the attached drawings in which.

Description of the preferred embodiment

Figure 1:
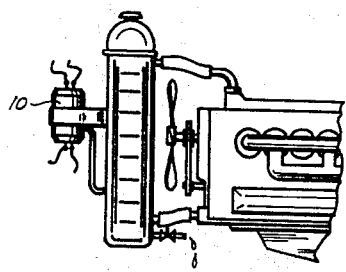
FIG. 1 is a schematic view showing a liquid level monitor for a pressurized engine cooling system.
Figure 2:
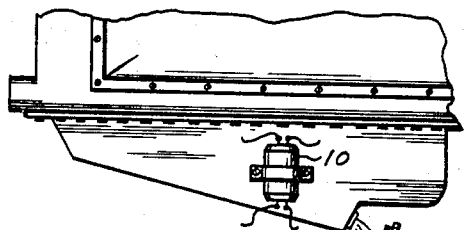
FIG. 2 is a schematic view showing the liquid level monitor mounted to a vehicle for monitoring the oil level in an engine crank case.

Referring in detail to the drawings, FIG. 1 shows a liquid level monitor 10 mounted to a vehicle cooling system radiator for monitoring the level of the fluid in the radiator. FIG. 2 shows another application of the liquid level monitor 10 in conjunction with an oil reservoir of a vehicle. Specifically, the liquid level monitor is mounted to a crank case of a vehicle for monitoring the oil level in the engine crank case.

The liquid level monitor 10 broadly comprises the following elements that are aligned along the axis of the monitor 10: a float assembly 11; a first switch assembly 12; a second switch assembly 13; a first set of magnetic actuators; and a second set of magnetic actuators.

The float assembly 11 comprises a cylindrical housing 14 made of a nonmagnetic material such as aluminum, plastic, or glass. The housing has a cylindrical body 15 with end plates 16 and 17 mounted at its ends to enclose the body 15. The end plates 16 and 17 are mounted to the body in such a manner as to prevent fluid from leaking therefrom. An upper outlet 19 is mounted in the body 15 for communicating with a liquid reservoir or venting to the atmosphere. A lower outlet 20 is mounted to the lower part of the body 15 and radially extends therefrom to communicate with the reservoir below the level of the fluid in the reservoir to be monitored.

A float 22 is positioned within the housing 14 for movement with the level of the liquid in the housing 14. The float 22 has a cylindrical body 23 that has an outer diameter slightly less than the inner diameter of the body 15 so that the float will be maintained in an upright position within the housing 14. The cylindrical body 23 is sealed by ends 24 and 25. The float 22 is freely positioned in and unconnected to the housing 14.

The switch assembly 12 comprises a switch casing 27 that is aligned along the axis of the liquid level monitor. The casing is made of an electrically nonconducting material such as plastic. The switch casing has a bevelled circumferential wall that fits within one end of the cylindrical body 15 and against the end plate 16. The casing 27 has a central cavity 28 formed therein having an end wall 29. The end wall 29 has a small aperture 30 extending therethrough. A radial cavity 31 is formed in the switch casing 27 to form a shoulder 32. One end of an electrically conductive leaf spring 33 is secured to the shoulder 32 by an electrically conductive terminal bolt 34. The free end of the leaf spring 33 extends into the central cavity 28 intersecting the axis of the liquid level monitor. One end of the terminal bolt 34 protrudes through the casing 27 and serves as an electrical terminal. The bolt 34 is secured to the casing 27 by a nut 35.

A contact and terminal bolt 37 made of an electrically conductive material is mounted in the aperture 30 with the head of the bolt protruding into the cavity 28 and the end thereof protruding from the outer surface of the casing 27 to serve as a terminal. The head of the bolt 37, designated with the numeral 38, performs the function of a stationary electrical contact. The terminal bolt 37 is secured to the casing 27 by a nut 41.

A disc-shaped magnet 43 is centrally mounted along the axis of the monitor to the underside of the free end of the spring 33 by a countersunk electrically conductive rivet 44. The rivet 44 extends through the magnet 43 and the spring 33 with the head thereof directly opposing the stationary electrical contact 38. The head of the rivet, designated by the numeral 45, performs the function of an electrical contact and may be referred to as a resiliently mounted contact. Contacts 38, 45 as shown are normally closed.

A disc-shaped magnet 46 is mounted along the axis of the monitor 10 to the end 24 of the float 22 in alignment with the magnet 43. The magnet 46 is attached to the end 24 by a connecting means such as a countersunk screw 47.

The switch assembly 13 is substantially identical to the switch assembly 12 and is mounted to the end plate 17 on the bottom of the float assembly 11. Switch assembly 13 has a casing 50 that is mounted to the end plate 17. A leaf spring 51 is mounted within the casing 50 by a terminal bolt 52. The free end of the spring 51 is positioned intersecting the axis of the monitor 10. The terminal bolt 52 extends through the casing and serves as an electrical terminal. A contact and terminal bolt 53 is aligned along the center of the liquid level monitor and extends through the casing 50 to serve as an electrical terminal. The head of the head of the bolt 53 forms a stationary contact 54.

A magnet 55 is mounted along the central axis to the upper side of the spring 51 by a countersunk rivet 66. The rivet head 57 performs the function of an electrical contact and may be referred to as a resiliently mounted contact. A disc-shaped magnet 60 is centrally mounted to the end 25 of the float 22. Contacts 54, 57 as shown are normally open.

Figure 3:
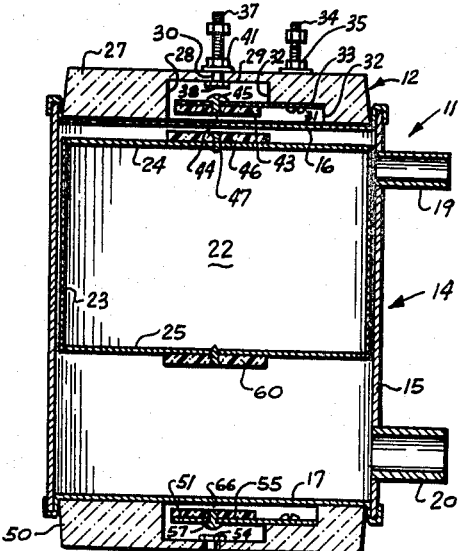
FIG. 3 is a cross sectional view of the liquid level monitor showing the principal features of my invention including the switch assembly.
Figure 5:
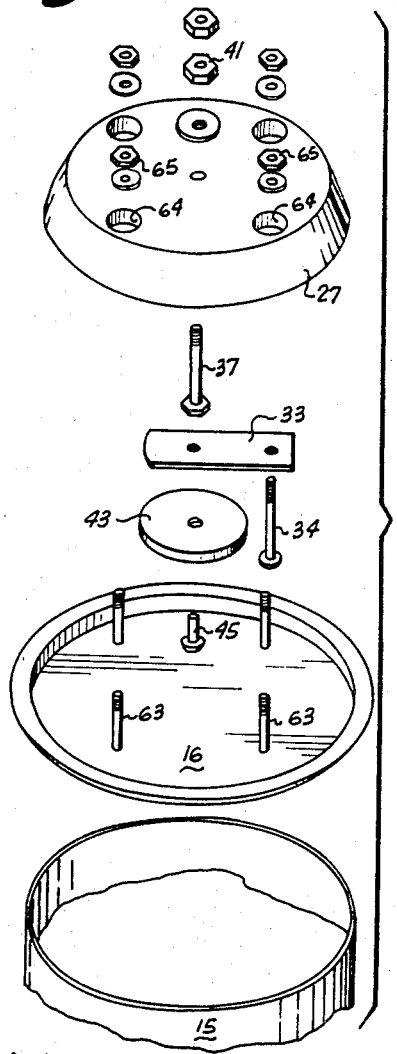
FIG. 5 is an enlarged perspective view showing the individual elements of the switch assembly.

The manner of attaching the switch assemblies 12 and 13 to the float assembly 11 is particularly important in order to prevent moisture from seeping into the switch assemblies and to prevent fluid from leaking from the float assembly. As shown in FIGS. 3 and 5, the end plates 16 and 17 have a plurality of bolts 63 embedded therein and protruding outwardly therefrom. The edges 63 of the plates 16 and 17 are rolled up and over the ends of the housing 14 similar to that performed in the manufacture of tin cans. The switch casings have axial apertures 64 formed therein to receive the bolts 62. The casings are secured to the end plates 16 and 17 by nuts 65 that are countersunk into the outer surfaces of the casings.

It may be desirable to not only seal the switch assemblies to the float housing but to also secure the switch assemblies in such a manner as to prevent tampering with the internal workings of the switch assemblies.

Figure 4:
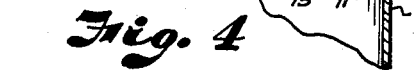
FIG. 4 is an enlarged fragmentary cross sectional view showing an alternative method of attaching the switch assembly.

Alternatively as shown in FIG. 4, the switch casings are formed to fit within the ends of the float housing without the necessity of having end plates secured to the body 15. Specifically, a cylindrical switch casing 70 is formed with a cylindrical wall 71 engaging the inner surface of the body 15. The wall 71 has an abutment ring 72 formed thereon for engaging the end of the housing 14 to properly position the casing 70 in the housing 14. The upper end of the casing 70 is bevelled to form an inclined surface 73 that flows into the abutment ring 72. The casing 70 has internal cavities similar to casing 27 for housing the switch mechanisms. An end plate 75 is attached to the lower end of the casing 70 to enclose and seal the switch mechanism from the fluid. The casing 70 is sealed to the housing 14 along the wall 71 and the ring 72 by a sealing material 76 that is heat resistant and insoluble in water or oil. A particularly effective sealant is a commercially available epoxy resin known as "Scotchcast" Brand Resin No. 16 produced by the Minnesota Mining & Manufacturing Company.

It has been found that for best results in providing quick actuation of the electrical contacts, the magnets 46 and 60 should have magnetic fields that are twice as strong or intense as the magnets 43 and 56. The magnets 43 and 46 and the magnets 55 and 60 may be mounted to attract or repel each other depending upon the particular application of the monitor. In this embodiment the magnets 43 and 46 are positioned to attract each other, whereas the magnets 55 and 60 are positioned to repel each other.

Figure 6:
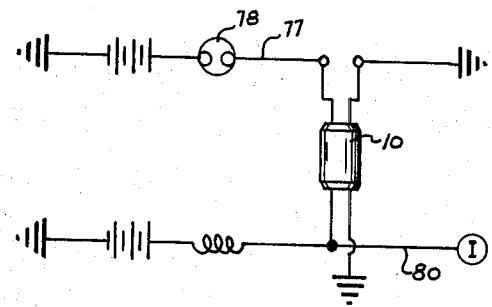
FIG. 6 is a schematic view showing the circuits connecting the switch assemblies.

The operation of the liquid level monitor 10 will be described in monitoring the level of the oil in an engine oil pan. As shown in FIG. 6 the monitor may be used in conjunction with electrical circuitry for warning the operator of the vehicle that the oil level is low, and for further grounding the engine ignition system when the oil level reaches a dangerously low level. The terminals of the switch assembly 12 may be connected to an electrical circuit 77 for operating a flashing light indicator 78 in the cab of the vehicle. The terminals of the switch assembly 13 may be connected to an electrical ignition circuit 80 of the vehicle.

Initially it will be assumed that the oil level is satisfactory with the float 22 being at the top of the housing cavity and the magnet 46 engaging the end plate 16 and attracting the magnet 43 to deflect the spring 33 and open the contacts 38 and 45. Magnet 55 is uninfluenced by the magnet 60 thus enabling the spring 51 to keep the contacts 54 and 57 open.

If for some reason the oil level in the pan begins to drop the float 22 will begin to move downward with the magnet 46 moving from the end plate 16. If the oil level falls below a predetermined level, the magnets 46 and 43 are sufficiently separated that the spring 33 will move the contact 45 into engagement with contact 38 to close the electrical circuit 77 and activate the flashing indicator 78. This will notify the operator that oil should be added.

If the warning is ignored and the level of the oil continues to fall the float 22 will continue to move downward. When the oil level reaches a level where continued operation of the engine should cease, the float will be near the bottom of the housing cavity to bring the magnet 60 into close proximity with the magnet 55. As the magnet 60 moves toward the end plate 17, the magnet 55 is repelled to deflect the spring 51 to move the contact 57 into engagement with the contact 54 to ground the vehicle ignition system to stop the engine.

What I claim is:

1. A float switch monitor for indicating the liquid level at two different elevations in a reservoir, said device comprising:
   (a) a cylindrical float housing having sealed nonmagnetic end plates, said housing further having an upper outlet that communicates with the reservoir above the liquid level and a second outlet that communicates with the reservoir below the liquid level;
   (b) a cylindrical float positioned freely within the housing for movement substantially along the axis of the housing;
   (c) a pair of switch assemblies sealed to the exterior of the end plates, each of said switch assemblies comprising:
      (1) a leaf spring with the free end thereof extending to the axis of the housing;
      (2) a pair of electrical contacts with one contact mounted on the spring for movement therewith;
   (d) two pairs of magnetic elements in which the elements of each pair are positioned along the axis on opposite sides of the end plates with one element being attached to the float and the other element attached to the free end of the leaf spring so that when the elements are in close proximity the leaf spring will deflect to actuate the respective electrical contacts.

2. A float-switch mechanism for monitoring the liquid level in a reservoir, comprising:
   (a) a float assembly having:
      (1) a non-magnetic cylindrical housing having sealed end plates with upper and lower outlets communicating with the reservoir; and
      (2) a cylindrical float freely positioned in the cylindrical housing;
   (b) a first switch assembly having an enclosed switch housing sealed to one of the end plates with a pair of electrical contacts mounted therein in which one of the electrical contacts is mounted for movement on a leaf spring;

(c) a first magnetic element mounted on one end of the cylindrical float for movement therewith;

(d) a second magnetic element mounted on the leaf spring in alignment with the first magnetic element for operating said first switch assembly when the first magnetic element moves to and from close proximity with the second magnetic element;

(e) a second switch assembly having an enclosed switch housing sealed to the other end plate with a pair of electrical contacts mounted therein;

(f) a third magnetic element mounted on the other end of the float; and (g) a fourth magnetic element operatively connected to one of the electrical contacts of the second switch assembly for operating said contacts when the third magnetic element moves to and from close proximity with the fourth magnetic element.

References Cited

UNITED STATES PATENTS

| | | | |
|---|---|---|---|
| 1,768,446 | 6/1930 | Gron | 200—84 |
| 1,995,895 | 3/1935 | Parks | 200—84 |
| 2,264,058 | 11/1941 | Vigren et al. | |
| 3,293,579 | 12/1966 | Harper. | |

FOREIGN PATENTS 553,090  5/1943  Great Britain.

ROBERT K. SCHAEFER, Primary Examiner

D. SMITH, JR., Assistant Examiner